United States Patent Office 3,071,115
Patented Jan. 1, 1963

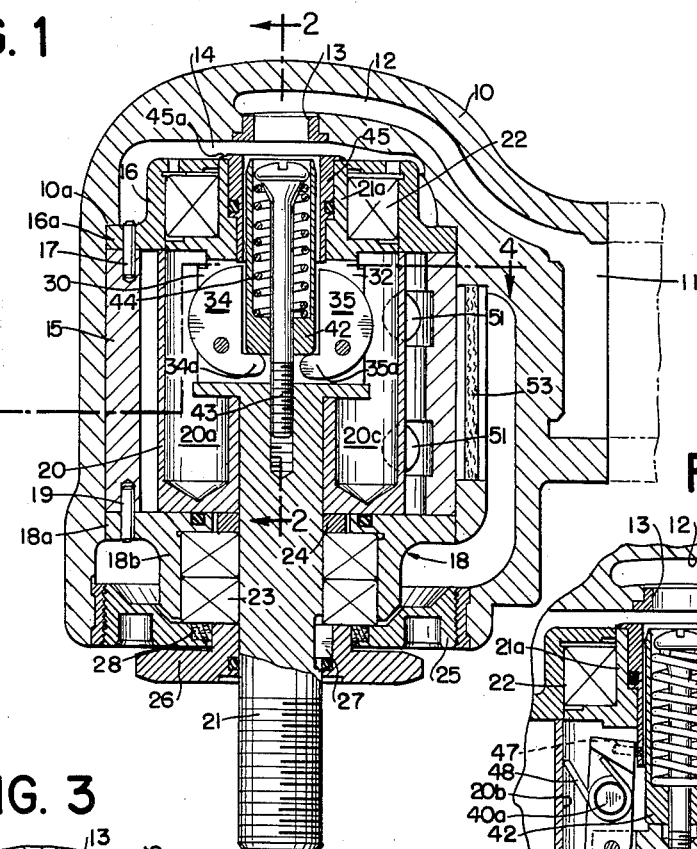

3,071,115
PNEUMATIC MOTOR WITH OVERSPEED SAFETY DEVICE
Donald E. Schott, Emerson, N.J., assignor to Thomas C. Wilson, Inc., Long Island City, N.Y., a corporation of New York
Filed July 6, 1961, Ser. No. 122,252
8 Claims. (Cl. 121—34)

This invention relates to pneumatic motors such as are used in various power-driven tools including hand-held grinders, brushes, etc. More particularly, the invention is concerned with a novel pneumatic motor provided with a safety device operating to stop the motor if its rated speed is exceeded. The safety device is simple in construction and reliable in operation and, as it functions only when an excessive motor speed develops, it is not subject to wear during normal motor operation. When the device has operated to stop the motor, the motor cannot be started again until the device has been restored to its original condition. Accordingly, it is not possible for a careless operator to defeat the purpose of the device.

Pneumatic motors used in power-driven tools are commonly provided with a governor which functions at a selected motor speed to restrict the supply of air to the motor and thus restrict the motor speed accordingly. Such governors are effective for their intended purpose as long as they are in good working order but they sometimes become inoperative because they are out of adjustment or because they have become jammed by dirt carried into the motor in the compressed air supply. When its governor is out of action, a pneumatic motor may develop excessive motor speeds with possible injury to property and personnel. It is, therefore, desirable to equip a pneumatic motor with an overspeed safety device which will function to stop the motor when the governor fails to act and the motor speed exceeds the rated speed.

The motor of the invention is provided with a safety device, which is operated by differential air pressures in the motor housing and is rendered operative by centrifugal force developed at motor speeds above a selected speed. The motor includes a cylinder and a hollow rotor mounted eccentrically in the cylinder and carrying the usual blades bearing at their outer edges against the inner surface of the cylinder and moving in and out of slots in the rotor as the latter turns. The housing is provided with an inlet for air under pressure and a passage leading from the inlet to the interior of the cylinder and defined in part by a circular valve seat. The interior of the rotor is open to the passage and the passage has a constriction between the seat and the cylinder, so that the air pressure in the constricted part of the passage is lower than that inside the rotor. The motor is provided with a conventional governor and, in addition, with a shut-off valve member having one end exposed to the air pressure in the constricted part of the passage and the other exposed to the air pressure inside the rotor. The shut-off valve member is thus urged into the passage by the differential air pressures to cut off the flow of air through the passage but it is normally restrained against such movement by holding means carried by the spindle and released by centrifugal force developed above a selected motor speed. Upon stoppage of the motor by the shut-off valve member, the motor cannot be started again, until it has been disassembled and the shut-off valve member has been restored to its original position and engaged again by the holding elements. When the motor is thus taken apart, the governor can be put back into proper operating condition.

For a better understanding of the invention, reference may be made to the accompanying drawing, in which FIGURE 1 is a longitudinal sectional view of a motor embodying the invention;

FIGURE 2 is a sectional view on the line 2—2 of FIGURE 1;

FIGURE 3 is a fragmentary longitudinal sectional view of the motor at 90° to FIGURE 1; and FIGURE 4 is a sectional view on the line 4—4 of FIGURE 1.

The motor illustrated in FIGURE 1 comprises a housing 10 formed of a casting and provided with an inlet 11 for the admission of air under pressure. The air travels from the inlet through a passage 12 which contains a circular valve seat 13 and has a constriction 14 beyond and adjacent to the seat.

A cylinder 15 with an eccentric bore 15a is mounted within the housing and is closed at its upper end by a top plate 16, which is of cup shape and has a peripheral flange 16a resting on top of the cylinder. The flange 16a of the top plate engages an internal shoulder 10a formed in the wall of the housing and the plate and cylinder are held against relative rotary movement by a pin 17 which extends through an opening in the flange and enters a bore in the cylinder. At its lower end, the cylinder is closed by a bottom plate 18, which has a flange 18a in contact with the bottom of the cylinder. The flange has an opening, through which a pin 19 extends into a bore in the end of the cylinder to hold the plate and cylinder against relative rotary movement.

A rotor 20 is mounted eccentrically within the cylinder on a spindle 24 which has an upper end section 21a running in an upper anti-friction bearing 22 disposed within the top plate 16. The spindle extends through an opening in the bottom plate 18 and is mounted for rotation in a lower anti-friction bearing 23 mounted within a cylindrical flange 18b projecting from the lower face of the bottom plate. A spacer ring 24 encircles the spindle between the top of the lower bearing and the lower end of the rotor and a retainer 25, which is threaded into an opening at the lower end of the housing, holds the bottom plate 18 in position. Beyond the retainer, the spindle carries a wheel flange 26 which is connected to the spindle by a key 27. A felt washer 28 encircles the hub of the wheel flange and lies in an internal channel in the retainer 25.

The rotor is formed with slots extending inward from its outer surface and spaced 90° apart and a blade 29 is mounted in each slot, the blades being held against the inner surface of the cylinder by centrifugal force during rotation of the rotor. Between the slots, the rotor is formed with a plurality of longitudinal chambers 20a, 20b, 20c, and 20d and the spindle has a pair of spaced ears 30, 31 within the chamber 20a and a similar pair of ears 32, 33 within the chamber 20c diametrically aligned with the chamber 20a. Between the ears of the pairs are pivotally mounted governor weights 34, 35, respectively. The spindle is also provided with a pair of spaced ears 36, 37 in the chamber 20b and a pair of similar ears 38, 39 in the diametrically aligned chamber 20d. A pair of shut-off weights 40, 41 are pivotally mounted between the pairs of ears 36, 37 and 38, 39, respectively.

The end of the spindle facing the valve seat 13 is hollow and a cup-shaped valve member 42 forming part of a governor is mounted in the interior of the spindle and encircles a screw 43 threaded into an axial bore in the spindle. The screw is encircled by a spring 44 bearing at one end against the inner surface of the head on the screw and, at the other, against the inner closed end of the valve member 42. The weights 34, 35 are provided with respective tails 34a, 35a, which bear against the closed end of the valve member 42 and the weights normally extend along opposite sides of the valve member.

A tubular shut-off valve member 45 lies within the hollow end of the spindle in telescoped relation to the valve member 42 and the valve member 45 has a lateral flange 45a at its outer end which is adapted to engage the valve seat 13. Extending axially from its inner end, the shut-off valve member 45 has diametrically disposed ears with openings for receiving pins 46, 47 extending from the exposed faces of the shut-off weights 40, 41. A pair of springs 48, 49 encircle pins 40a, 41a on the weights 40, 41, respectively, and the springs act on the weights and on the inner surfaces of the chambers 20b, 20d to urge the weights to cause their ends carrying the pins to move toward each other. In the normal condition of the motor, the springs hold the weights with their pins 46, 47 in the openings in the ears of the shut-off valve member 45.

The air traveling through the passage 12 beyond the constriction 14 passes through openings in the flange 16a of the top plate 16 and enters passages 50 in the wall of the cylinder 15 which lead to the interior of the cylinder. After acting on the blades 29 of the rotor, the air escapes from the interior of the cylinder through outlet ports 51, 52, passes through a porous muffler plate 53, and then escapes through ports in the wall of the housing to the atmosphere.

In the operation of the motor, air under pressure is admitted into the housing and travels through the cylinder causing the rotor to rotate. The air under pressure also flows from the passage 12 between the governor valve member 42 and the shut-off valve member 45 and enters the chambers in the interior of the rotor. As the rotor speed increases, the governor weights 34, 35 are swung outwardly away from the axis of the spindle by centrifugal force and, in such movement of the weights, their tails 34a, 35a act on the closed end of the valve member 42 and move it toward the valve seat 13 against the action of the spring 44. As the valve member approaches the valve seat, the flow of air into the cylinder is reduced and the governor thus functions to maintain the rate of rotation of the spindle within a range determined by the initial compression of the spring 44. During the operation of the motor, the inner end surfaces of the shut-off valve 45 are exposed to the pressure of the air within the interior of the rotor while the outer end face of the valve member is exposed to the lower air pressure in the constriction 14 of passage 12. The respective areas of the inner end faces and the outer end face of the shut-off valve member are so proportioned that the differential air pressures acting on the valve member tend to move it into the passage 12 but the valve member is normally held against such movement by the pins 46, 47 on the weights 40, 41. If, for any reason, the governor becomes disabled and the motor speed increases sufficiently, the weights 40, 41 will be swung by centrifugal force against the actions of the springs 48, 49 and such movement of the weights will cause their pins 46, 47 to move out of the openings in the shut-off valve member 45. As soon as the member is freed, it will be moved toward the valve seat 13 by the differential air pressures acting on it and will assume the position shown in FIGURE 3, in which the shut-off valve member has engaged the valve seat and entirely cut off the flow of air to the cylinder to stop the motor.

When the shut-off valve has operated as described, the motor cannot be re-started until the shut-off valve member has been moved back to its original position and does not project into the passage 12. The restoration of the shut-off valve member to its original position requires that the motor be disassembled and, when this has been done, the governor can be restored to proper operating condition.

I claim:

1. A pneumatic motor, which comprises a housing with an inlet for air under pressure, a cylinder within the housing, a passage in the housing leading from the inlet to the cylinder and formed in part of a circular valve seat, the passage having a constriction between the seat and the cylinder, a hollow rotor within the cylinder, the interior of the rotor being open to the passage, a spindle carrying the rotor, a governor within the housing for controlling the flow of air through the valve seat, the governor including a valve member co-operating with the valve seat and means actuated by centrifugal force for operating the valve member, a shut-off valve member mounted on the spindle for movement lengthwise thereof into the passage to stop the flow of air to the cylinder, the shut-off valve member having one end exposed to the air pressure within the interior of the rotor and the other to the lower air pressure in the constriction in the passage, and means on the spindle normally holding the shut-off valve against movement by the differential air pressures acting on it, the holding means being rendered inoperable by centrifugal force developed above a selected spindle speed.

2. The motor of claim 1, in which the shut-off valve member is mounted in an axial recess in the spindle.

3. The motor of claim 2, in which the holding means include a pair of weights mounted on the spindle for swinging movement in a plane through the axis of the spindle.

4. The motor of claim 3, in which the weights and shut-off valve member have interengageable parts.

5. The motor of claim 4, in which a spring acts on each weight to hold it with the parts on the weight and shut-off valve member interengaged.

6. The motor of claim 5, in which the weights and springs are disposed within a cavity in the rotor and one end of each spring bears against the wall of the cavity and the other end bears against the associated weight.

7. The motor of claim 1, in which the shut-off valve member is tubular and is movable into engagement with the valve seat to stop the flow of air to the cylinder.

8. The motor of claim 7, in which the shut-off valve member is mounted in telescoped relation to the governor valve member.

References Cited in the file of this patent
UNITED STATES PATENTS

| | | |
|---|---|---|
| 1,884,584 | Cross | Oct. 25, 1932 |
| 2,586,968 | Maclay | Feb. 26, 1952 |